(12) United States Patent
Bahekar

(10) Patent No.: US 10,138,869 B2
(45) Date of Patent: Nov. 27, 2018

(54) MICRO WIND CELL

(71) Applicant: Ajey Bahekar, Maharashtra (IN)

(72) Inventor: Ajey Bahekar, Maharashtra (IN)

(73) Assignee: Ajey Bahekar, Maharashtra (IN)

( * ) Notice: Subject to any disclaimer, the term of this patent is extended or adjusted under 35 U.S.C. 154(b) by 2 days.

(21) Appl. No.: 15/265,683

(22) Filed: Sep. 14, 2016

(65) Prior Publication Data

US 2017/0074242 A1    Mar. 16, 2017

(30) Foreign Application Priority Data

Sep. 15, 2015 (IN) .......................... 3543/MUM/2015

(51) Int. Cl.
*F03D 3/00* (2006.01)
*F03D 9/11* (2016.01)
*F03D 9/45* (2016.01)
*F03D 9/25* (2016.01)

(52) U.S. Cl.
CPC ................ *F03D 3/005* (2013.01); *F03D 9/11* (2016.05); *F03D 9/25* (2016.05); *F03D 9/45* (2016.05); *F05B 2220/706* (2013.01); *F05B 2230/21* (2013.01); *F05B 2240/211* (2013.01); *F05B 2240/9112* (2013.01); *F05B 2250/70* (2013.01); *F05B 2280/4003* (2013.01); *F05B 2280/6003* (2013.01); *Y02B 10/30* (2013.01); *Y02E 10/728* (2013.01); *Y02E 10/74* (2013.01); *Y02P 70/523* (2015.11)

(58) Field of Classification Search
CPC ................................. F03D 3/005; Y02E 10/74
USPC ...................................................... 290/44, 55
See application file for complete search history.

(56) References Cited

U.S. PATENT DOCUMENTS

| 4,220,870 A * | 9/1980 | Kelly ..................... F03D 13/20 290/44 |
| 8,704,394 B1 * | 4/2014 | Jones ....................... F03D 9/00 290/44 |
| 2007/0231139 A1 * | 10/2007 | Yokoi .................... F03D 3/005 416/119 |
| 2008/0258468 A1 * | 10/2008 | Fuller ..................... F03D 3/02 290/55 |

(Continued)

OTHER PUBLICATIONS

Spera, David A., Editor, "Wind Turbine Technology—Fundamental Concepts of Wind Turbine Engineering," ASME Press, New York, 1994, p. 7-10.

*Primary Examiner* — Viet Nguyen
(74) *Attorney, Agent, or Firm* — Kenealy Vaidya LLP

(57) ABSTRACT

Disclosed is a micro wind cell and a micro wind cell array for generation of power. The micro wind cell for generating wind power may comprise a rotor, an upper support and a lower support, a spacer rod, one or more bearings, a generator mount, a power generator and a rotor pin. The rotor further comprises a plurality of rotor blades and a through hole formed at the center of the rotor. The through hole is configured to receive a rotor pin. Further, the rotor blades are configured perpendicular to the direction of wind and the rotor rotates for generation of power. The micro wind cell array comprises one or more micro wind cells for generating power utilizing flow of wind from multiple directions along a wall, and a battery pack for storing the generated power. The micro wind cell array in isosceles quadrilateral shape may enable stacking of arrays.

16 Claims, 19 Drawing Sheets

(56) References Cited

U.S. PATENT DOCUMENTS

| | | | | |
|---|---|---|---|---|
| 2008/0298965 | A1* | 12/2008 | Keena | F03D 3/068 |
| | | | | 416/41 |
| 2009/0285667 | A1* | 11/2009 | Otto | F03B 17/00 |
| | | | | 415/4.3 |
| 2010/0109337 | A1* | 5/2010 | Wang | F03D 3/067 |
| | | | | 290/55 |
| 2010/0181777 | A1* | 7/2010 | Grigg | F03D 3/002 |
| | | | | 290/55 |
| 2011/0158789 | A1* | 6/2011 | Park | F03B 13/26 |
| | | | | 415/73 |
| 2011/0221203 | A1* | 9/2011 | Miller | F03D 9/007 |
| | | | | 290/55 |
| 2011/0304142 | A1* | 12/2011 | Baker | F03D 1/04 |
| | | | | 290/44 |
| 2012/0019002 | A1* | 1/2012 | Lee | H02P 9/00 |
| | | | | 290/50 |
| 2012/0112459 | A1* | 5/2012 | Crowe | F03D 3/061 |
| | | | | 290/44 |
| 2014/0056708 | A1* | 2/2014 | Samson | F03D 3/005 |
| | | | | 416/170 R |
| 2014/0077504 | A1* | 3/2014 | Epstein | F03D 3/065 |
| | | | | 290/55 |
| 2014/0375060 | A1* | 12/2014 | Lin | F03D 3/005 |
| | | | | 290/55 |
| 2016/0032889 | A1* | 2/2016 | Tan | F03D 9/007 |
| | | | | 290/55 |
| 2017/0045034 | A1* | 2/2017 | Lai | F03D 3/02 |

* cited by examiner

MICRO WIND CELL

CROSS-REFERENCE TO RELATED APPLICATIONS AND PRIORITY

The present application claims priority from Indian Application No. 3543/MUM/2015 filed on 15 Sep. 2015.

TECHNICAL FIELD

The present subject matter described herein, in general, relates to wind power generation and more particularly a micro wind cell and a micro wind cell array for generating wind power.

BACKGROUND

Electrical generation from environmentally friendly sources, or "alternative energy sources," has long been a goal of many, for both environmental and economic concerns. Wind-powered generators have been used for this purpose. Generally speaking, wind turbines transfer the wind's kinetic energy into electrical energy. This has been achieved by exposing a rotor to wind. The rotor turns a generator typically mounted aft of the rotor, driving the generator to create electricity. The rotor and generator combination (i.e., wind turbine generator) is mounted at the top of a tower high above the ground to expose it to high winds. The tower is attached to a foundation and is configured to endure significant structural loads.

Generally, large commercial grade wind turbines generate significant amounts of power. However, these large commercial grade generators must be located away from the consumers. All of the giant wind turbine machines require costly towers and/or support structures which greatly add to the final installation costs, without improving the basic operating performance of the wind power system. The large, centralized wind conversion installations also require large transmission towers which tie into the utility power grid for the locality of the auxiliary power site. The distribution and transmission systems are required to move the power from the large commercial generation facility to the consumers.

Wind turbine generators have also been used in small-scale applications, typically ranging between 50 watts and 100 kilowatts. Even for small-scale applications, a number of factors must be satisfied to make the investment worthwhile. For example, proper location and mounting of wind generators can be an issue. In many current approaches, a single, relatively small, wind turbine is mounted on a tower away from other structures such that the turbine is spaced away from turbulent flow caused by such structures. Thus, current approaches are typically limited to rural settings and are impractical in many other settings, in particular urban/cosmopolitan cities with limited space.

SUMMARY

Before the present micro wind generator(s) for generation of wind power, are described, it is to be understood that this application is not limited to the particular assembly described, as there can be multiple possible embodiments which are not expressly illustrated in the present disclosures. It is also to be understood that the terminology used in the description is for the purpose of describing the particular implementations or versions or embodiments only, and is not intended to limit the scope of the present application. This summary is provided to introduce aspects related to micro wind generator(s) for generation of wind power. This summary is not intended to identify essential features of the claimed subject matter nor is it intended for use in determining or limiting the scope of the claimed subject matter.

In an implementation, a micro wind cell for generation of power is described. The micro wind cell comprises a rotor comprising a plurality of rotor blades and a rotor through hole formed at the center of the rotor, wherein the rotor through hole is configured to receive a rotor pin, wherein each rotor blade is exposed to wind force for enabling rotation of the rotor in order to generate power. The micro wind cell further comprises an upper support and a lower support, wherein each of the upper support and the lower support further comprises a horizontal plate configured with a center through hole. The micro wind cell further comprises a generator mount fastened to the upper support in order to mount a power generator adapted to generate the power based upon rotation of the rotor.

In another implementation, a micro wind cell array for generation of power is described. The micro wind cell array may comprise one or more micro wind cells for generation of power utilizing wind flow from multiple directions along a wall. Each micro wind cell may comprise a rotor configured to rotate due to wind flow from multiple directions, wherein the rotor comprises a plurality of rotor blades configured perpendicular to the direction of wind flow. The micro wind cell array may further comprise a power generator, coupled to the rotor, configured to generate power based upon the rotation of the rotor. The micro wind cell array may further comprise a mount cover installed at the top and bottom of a stack of the micro wind cell arrays, wherein the mount cover is enabled for covering the assembly of micro wind cell array. The micro wind cell array may further comprise a micro wind cell mount at the top and bottom of each micro wind cell array with holes and slots for mounting and assembling of the one or more micro wind cells and further for insertion of stack rods and mount spacers. The micro wind cell array may further comprise a stack support inserted between two consecutive micro wind cell arrays for engaging the two consecutive micro wind cell arrays, wherein the stack support is configured with holes and slots for mounting and assembling of the cell mounts of the micro wind cell arrays and further for insertion of the stack rods.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and assembly disclosed in the document and the figures.

The present subject matter is described detail with reference to the accompanying figures. In the figures, the leftmost digit(s) of a reference number identifies the figure in which the reference number first appears. The same numbers are used throughout the drawings to refer various features of the present subject matter.

DETAILED DESCRIPTION

Figure 1A:
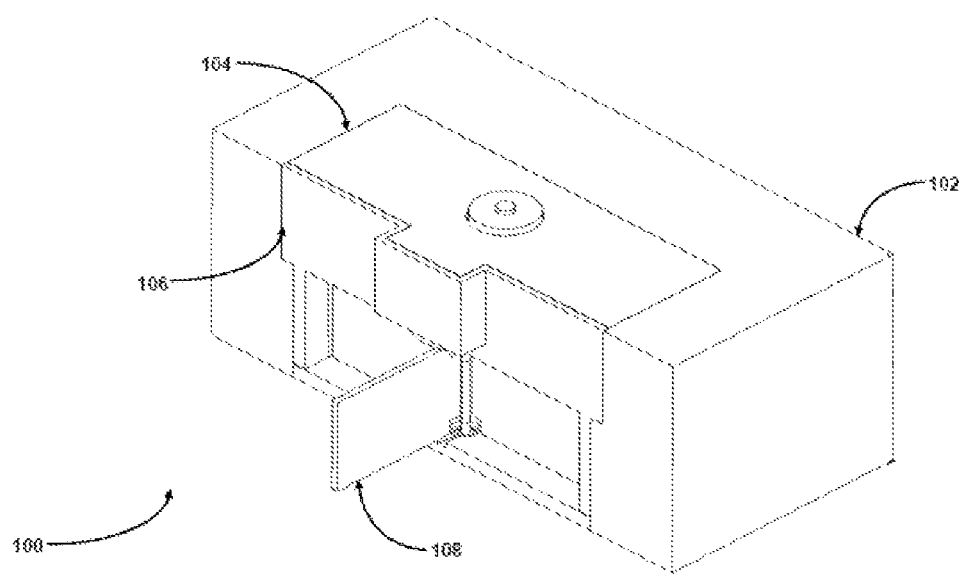
FIG. 1A, FIG. 1B, and FIG. 1C illustrate a micro wind cell for generation of power, in accordance with an embodiment of the present subject matter

In an implementation, a micro wind cell and a micro wind cell array for generating wind power is described. In one example, the micro wind cell array comprising a micro wind cell may be implemented on a wall of a building. In one other example, the micro wind cell array comprising a micro wind cell may be implemented on an exterior wall of a building. In one other implementation the micro wind cell array comprising a micro wind cell may be embedded in a wall of a building. Further, the micro wind cell generates power due to flow of wind along the wall of a building. In one more example, micro wind cell array comprises micro wind cell in a horizontal array. In the implementation micro wind cell for generating wind power comprises a rotor, an upper shell, a housing and a foam block.

The rotor further comprises a plurality of rotor blades and a through hole formed at the center of the rotor. The through hole is configured to receive a rotor pin. Further, the rotor blades are configured perpendicular to the direction of wind and the rotor rotates for generation of power. The upper shell comprises a top plate section connected to a bottom C section and the bottom C-section is configured to receive the rotor. Further, upon assembling the housing and the upper shell forms an enclosure for housing a direct current (DC) generator and gears. The housing further comprises a first top section connected to a second slot section to form an L-shape and a third bottom section connected to the second slot section to form a C-shape. The C-shape is configured to receive the bottom C-section of the upper shell. Further, the foam block encloses the housing on assembly for damping the vibrations generated during the operation of the micro wind cell wherein. In one other example, the foal block may be any other energy absorbing material for damping the vibrations generated during the operation of the wild cell.

In one other implementation a micro wind cell array for generation of power, is disclosed. The micro wind cell array comprises a micro wind cell for generating power utilizing flow of wind along a wall, and a battery for storing the generated power. The micro wind cell further comprises a rotor configured to rotate due to wind flow and a DC generator coupled to the rotor configured to generate power based on the rotation of the rotor. The rotor further comprises a plurality of blades configured perpendicular to the direction of wind flow.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any assembly and methods similar or equivalent to those described herein can be used in the practice or testing of embodiments of the present disclosure, the exemplary, assembly and methods are now described. The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described, but is to be accorded the widest scope consistent with the principles and features described herein.

Figure 1B:
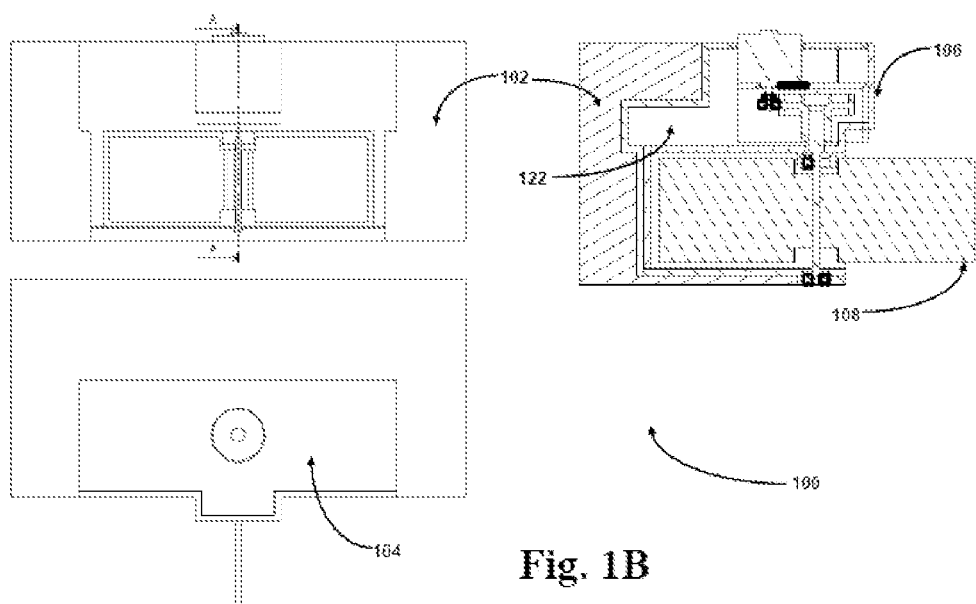
Figure 1C:
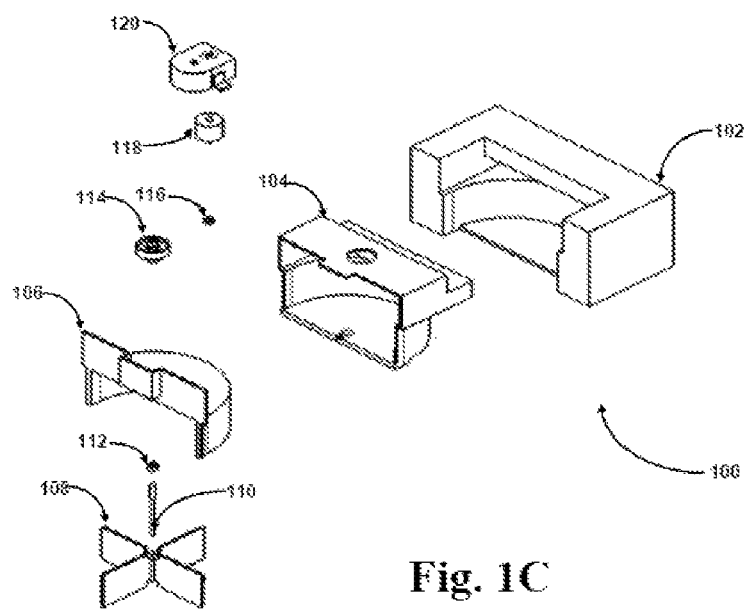

Referring now to FIG. 1A, FIG. 1B, and FIG. 1C a micro wind cell 100 for generation of power, in accordance with an embodiment of the present subject matter is illustrated. In the embodiment, the micro wind cell 100 comprises a rotor 108, an upper shell 106, a housing 104, and a foam block 102. In one embodiment, during assembly of the micro wind cell 100, the rotor 108, is mounted inside the upper shell 106 utilizing a rotor pin and the DC generator 118 is mounted on the upper shell 106 via a generator mount 120 and coupled to the rotor 108 via gears 116 and 114, a bearing 112 and a rotor pin 110. Further to the mounting of the rotor 108 in the upper shell 106, the upper shell 106 comprising the rotor 108 is assembled inside the housing 104 such as to form an enclosure 122 between the upper shell 106 and the housing 104. In the embodiment the enclosure 122 is formed on the top sections of the upper shell 106 and the housing 104. Further, the enclosure 122 surrounds the gears 116 and 114 and the DC generator 118. Upon assembling of the upper shell 106 and the housing 104, the housing 104 is enclosed in the foam block 102, for dampening the vibrations during operation. In one example, the micro wind cell 100 may be manufactured using engineering plastics, composites or co polymers. In another example, the micro wind cell 100 may be manufactured using an injection molding process or high pressure die casting process.

Foam Block 102

Figure 2:
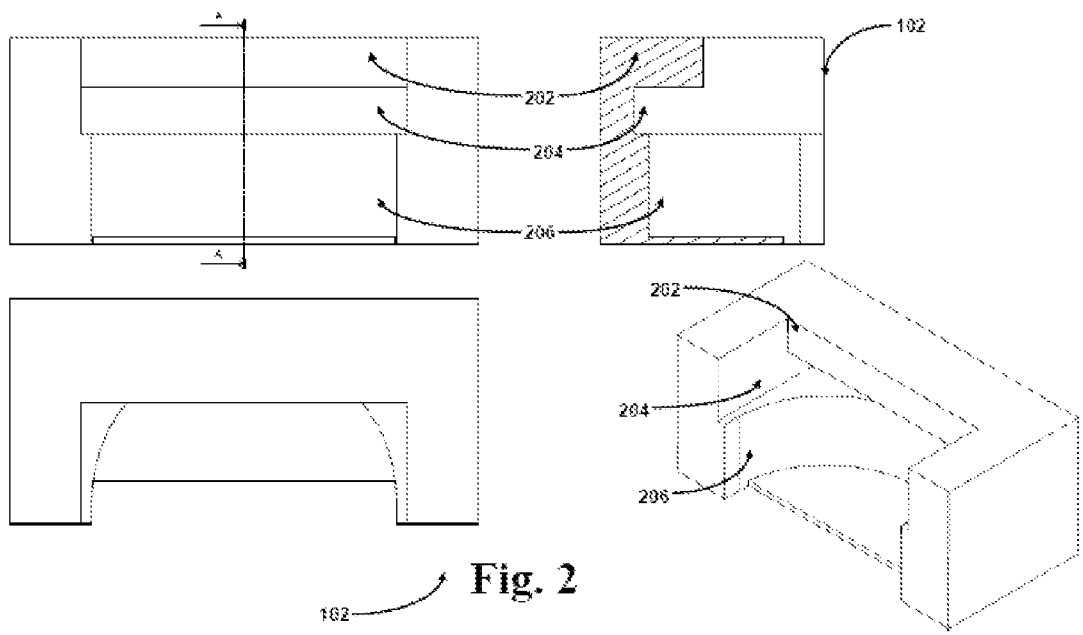
FIG. 2 illustrates a foam block of the micro wind cell in accordance with an embodiment of the present subject matter.

Referring to FIG. 2, in the implementation, the foam block 102 for damping the vibration generated during the operation of the micro wind cell is illustrated in accordance with an embodiment of the present subject matter. In the embodiment the foam block comprises a first top section 202 connected to a second slot section 204 to form a L-shape channel. The foam block 102 further comprises a third bottom section 206 connected to the second slot section 204 to form a C-shape cavity. In the embodiment upon the assembly of the micro wind cell 100 the L-shape channel of the foam block 102 receives the L-shape formed in the top part of the housing 104 and the C-shape cavity of the foam block 102 receives the C-shape formed in the bottom part of the housing 104. In one example, the foal block may be any other energy absorbing material for damping the vibrations generated during the operation of the wild cell.

Housing 104

Figure 3:
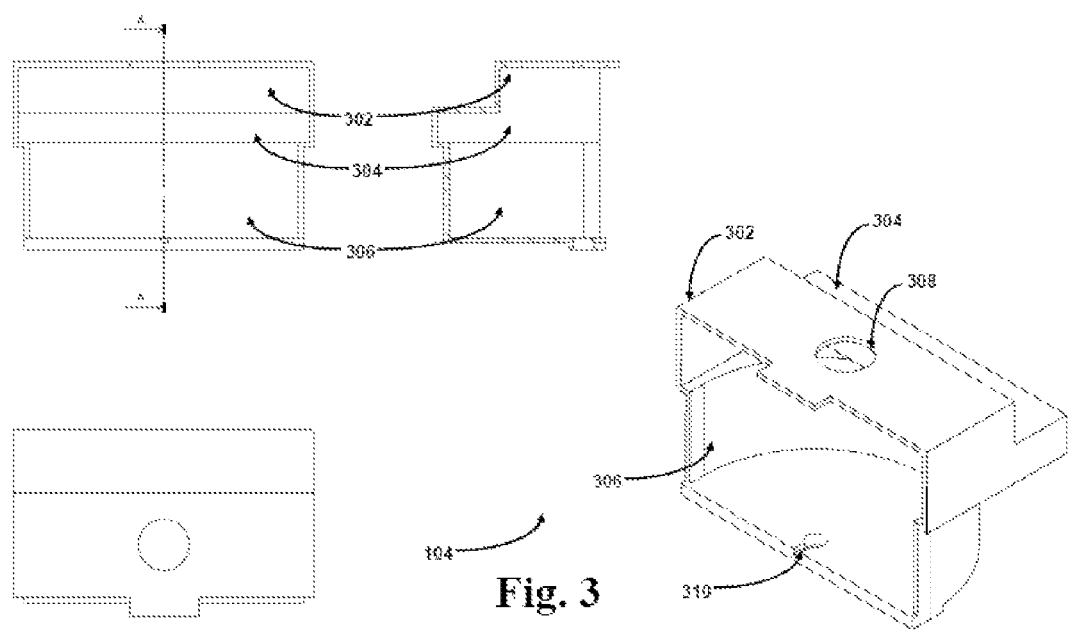
FIG. 3 illustrates a housing of the micro wind cell in accordance with an embodiment of the present subject matter.

Referring to FIG. 3, in an implementation, a housing 104 for the micro wind cell is illustrated in accordance with an embodiment of the present subject matter. The housing 104 comprises a first top section 302 connected to a second slot section 304 to form an L-shape. The housing 104 further comprises a third bottom section 306 connected to the second slot section 304 to form a C-shape. In the embodiment upon the assembly of the micro wind cell 100 the C-shape receives the bottom C-section 404. Further upon the assembly the L-shape of the housing 104 fits in to the L-shape channel formed in the top section of the foam block 102 and the C-shape of the housing 104 fits in to the C-shape cavity formed in the bottom section of the foam block 102. The housing 104 further comprises a top hole 308 for holding the DC generator 118 and a bottom hole 310 for holding the rotor 108.

Upper Shell 106

Figure 4:
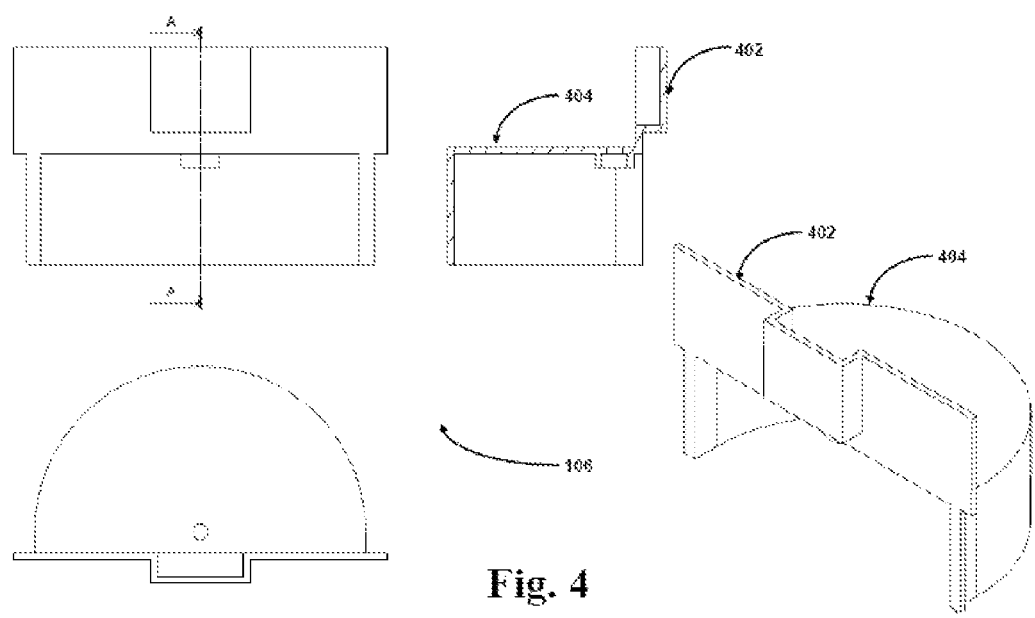
FIG. 4 illustrates an upper shell of the micro wind cell, in accordance with an embodiment of the present subject matter.

Referring to FIG. 4, in the implementation, an upper shell 106 for the micro wind cell is illustrated in accordance with an embodiment of the present subject matter. In the embodiment the upper shell 106 comprises a top plate section 402 connected to a bottom C section 404. In the embodiment upon the assembly of the micro wind cell 100 the bottom C-section 404 of the upper shell 106 receives the rotor 108 and further the C-section the upper shell 106 fits into the C-shape formed in the bottom section of the housing 104.

Rotor 108

Figure 5:
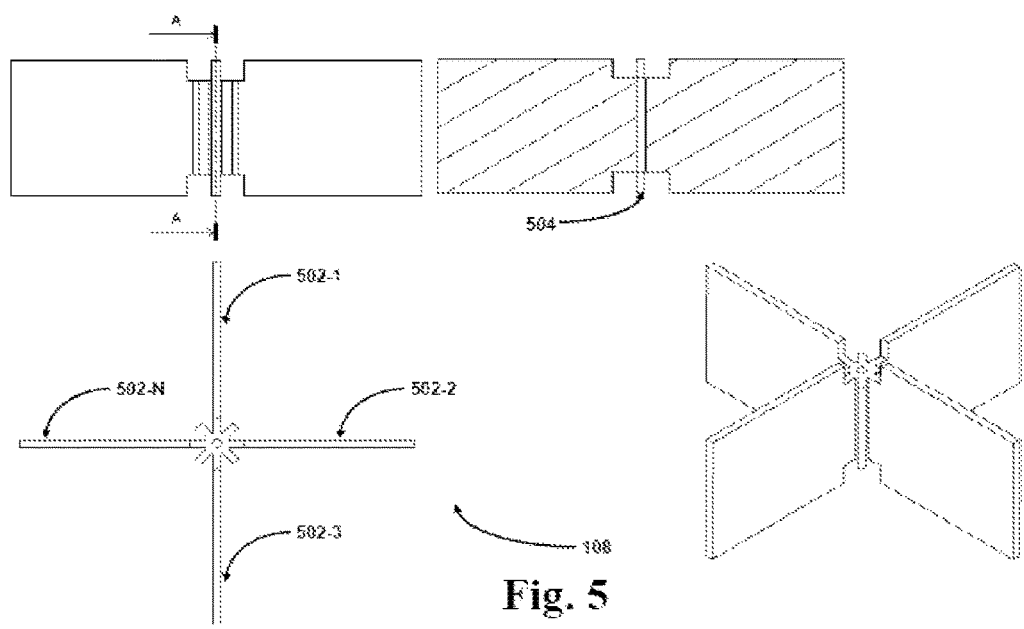
FIG. 5 illustrates a rotor of the micro wind cell in accordance with an embodiment of the present subject matter.
Figure 6:
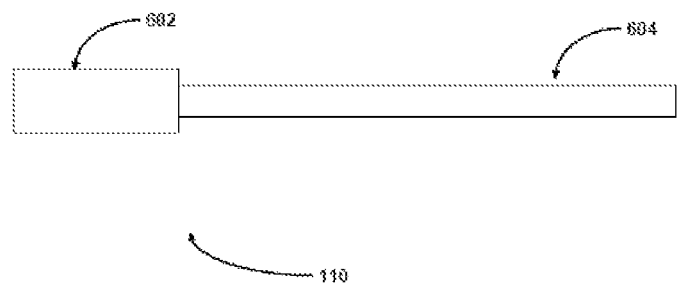
FIG. 6 illustrates a rotor pin of the micro wind cell, in accordance with an embodiment of the present subject matter.

Referring to FIG. 5, in an implementation a rotor 108 for the micro wind cell is illustrated in accordance with an embodiment of the present subject matter. In the embodiment, the rotor 108 comprises a plurality of rotor blades 502 and a through hole 504 formed at the center of the rotor. The rotor blades 502 are configured perpendicular to the direction of wind rotates for generation of power. Further, upon assembly of the micro wind cell 100, the through hole 504 receives a rotor pin 110. In one example, the rotor blades may have a straight profile. In another example, the profile may be configured for maximum power generation and efficiency. Referring to FIG. 6, in an implementation, a rotor pin 110 of the micro wind cell is illustrated in accordance with an embodiment of the present subject matter. In one embodiment, the rotor pin 100 comprises a head section 602 and a bottom section 604. Upon assembly of the micro wind cell 100, the rotor pin bottom section 604 passes through the rotor and locks the rotor 108 in the micro wind cell such as to prevent any translation motion of the rotor 108 and provide unrestricted rotational motion of the rotor 108.

Micro Wind Cell Array 700

Figure 7:
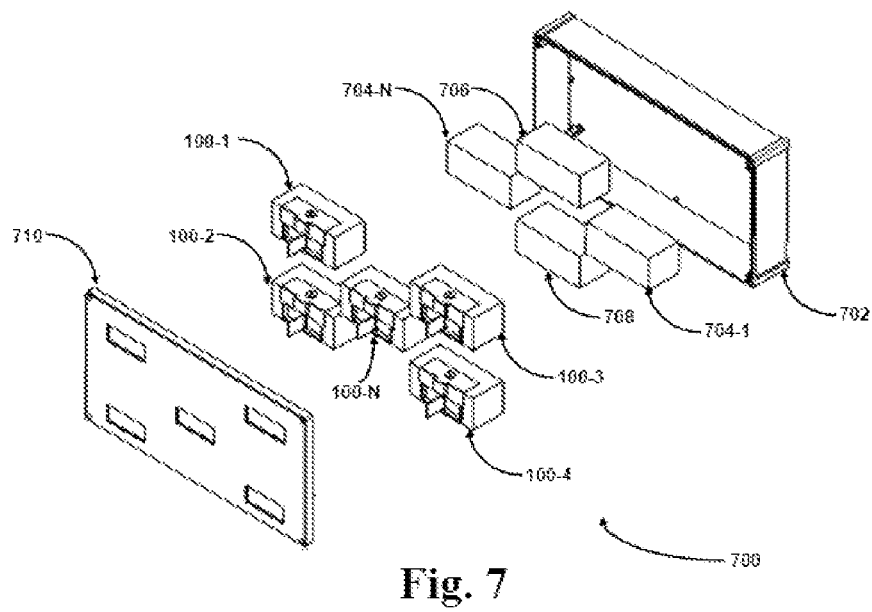
FIG. 7 illustrates, a micro wind cell array, in accordance with an embodiment of the present subject matter.

Referring to FIG. 7, in an implementation, a micro wind cell array 700 is illustrated in accordance with an embodiment of the present subject matter. In one embodiment the micro wind cell array 700 comprises the micro wind cells 100 arranged in a row or column for generating wind power utilizing the wind flowing along a wall. The micro wind cell array 700 further comprises a bridge rectifier for a constant polarity output. Further in one example, the bridge rectifier is coupled with a MCP1640 IC to obtain a stable voltage of 4 volts. In another example, the bridge rectifier may be coupled with any other IC for obtaining a stable voltage. The micro wind cell array 700 also comprises a battery charging circuit (706 and 708) for charging the battery 704. In one embodiment, the micro wind cell array 700 also comprises an inverter configured to convert DC power to AC power and an outlet. In one example the outlet may be one of a AC three pin plug point, a AC two pin plug point, a DC power point, a USB point, or a mobile charging point. In one example, A.C. output may be in the range of 100 volts to 240 volts (50-60 Hz). In one example, the micro wind cell array 700 may be manufactured using engineering plastics, composites or co polymers. In another example, the micro wind cell array 700 may be manufactured using an injection molding process or high pressure die casting process.

Figure 8:
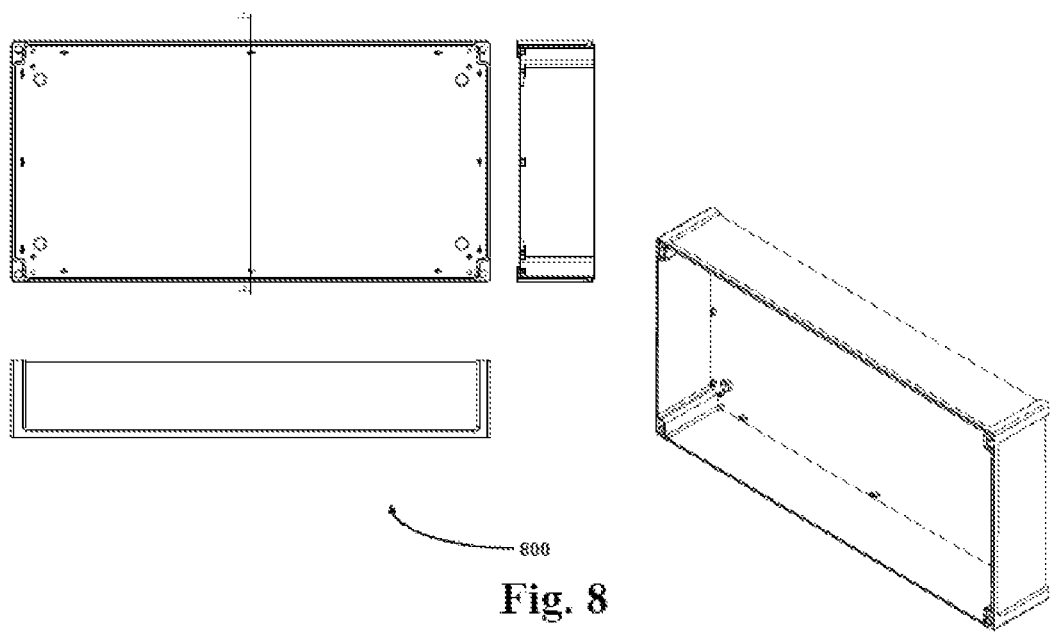
FIG. 8 illustrates an enclosure black plate of the micro wind cell array, in accordance with an embodiment of the present subject matter.
Figure 9:
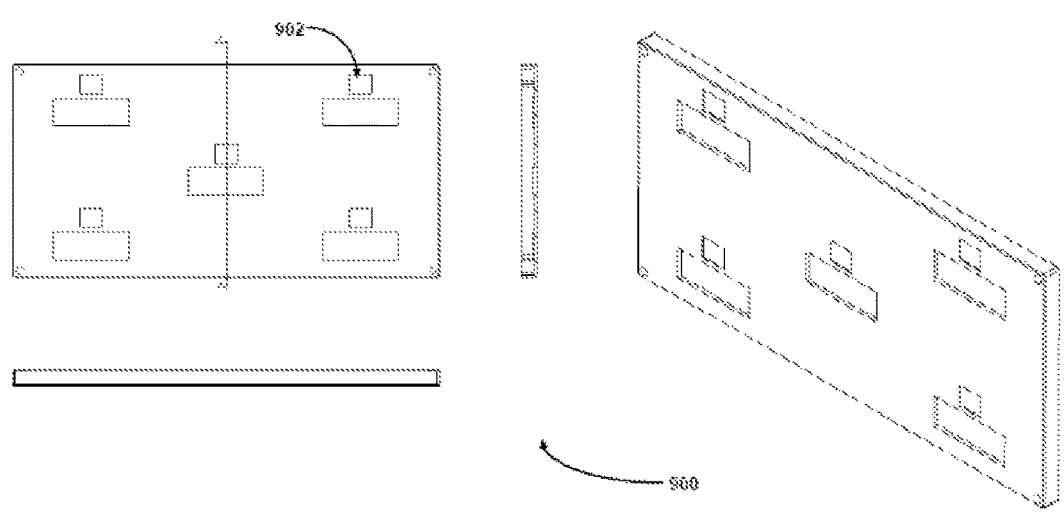
FIG. 9 illustrates an enclosure front plate of the micro wind cell array, in accordance with an embodiment of the present subject matter.

Referring to FIG. 8 and FIG. 9 in an implementation, an enclosure for the micro wind cell array is illustrated in accordance with an embodiment of the present subject matter. The micro wind cell array 700 of further comprising an enclosure. In one example, the enclosure may be an IP65 enclosure. In one other example, the enclosure may be weather sealed enclosure. In the embodiment, the enclosure comprises an enclosure back part 800 and an enclosure lid 900 for enclosing all the parts of the micro wind cell array 700. In one configuration the enclosure lid 900 comprises a rotor blade opening 902 configured to receive the rotor blade 502 of a micro cell 100. Further, in one example the enclosure may be manufactured using an injection molding process or high pressure die casting process. In one another example, the enclosure may be manufactured using engineering plastics, composites or co polymers.

Figure 10A:
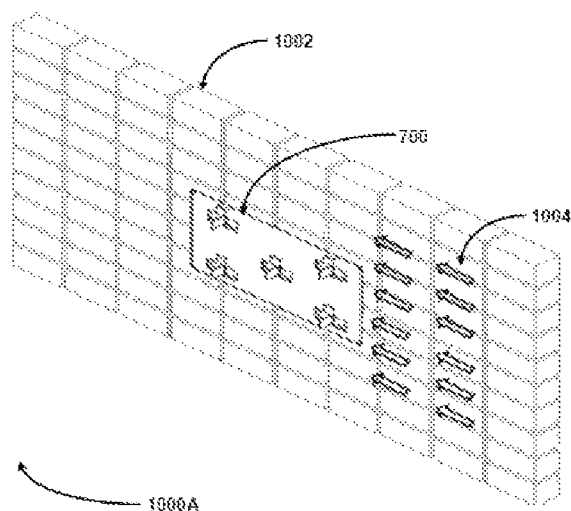
FIG. 10A and FIG. 10B illustrate various mounting embodiments of the micro wind cell array, in accordance with an embodiment of the present subject matter.
Figure 10B:
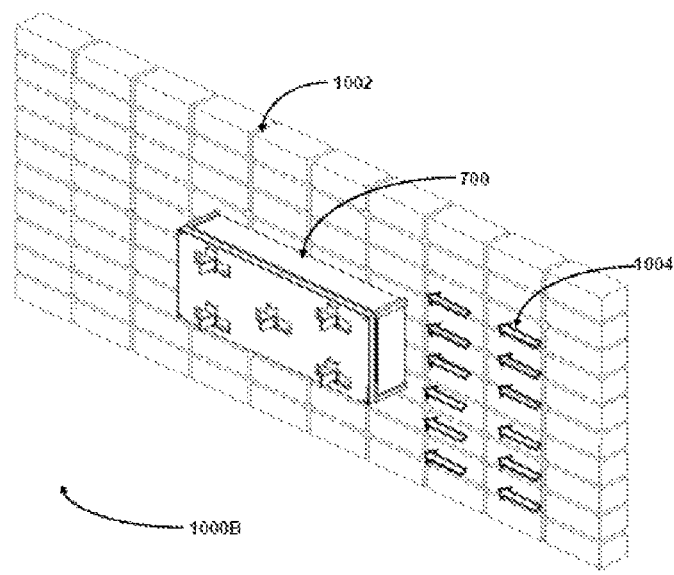

Referring FIG. 10A and FIG. 10B in an implementation, various mounting embodiments of the micro wind cell array 700 is illustrated in accordance with an embodiment of the present subject matter. In one embodiment, as shown in FIG. 10A, the micro wind cell array 700 is mounted on a wall 1002 of a building in order to generate wind power utilizing the wind flowing along the wall of the building 1004. In another embodiment, as shown in FIG. 10b, the micro wind cell array 700 is enclosed in a wall 1002 of a building in order to generate wind power utilizing the wind flowing along the wall of the building 1004.

In another implementation, a micro wind cell and a micro wind cell array for generating wind power is described. In one example, the micro wind cell array comprising one or more micro wind cells may be implemented on a wall of a building. In one other example, the micro wind cell array comprising one or more micro wind cells may be implemented on an exterior wall of a building. In one other implementation the micro wind cell array comprising one or more micro wind cells may be embedded in a wall of a building. In yet another implementation, the micro wind cell array comprising one or more micro wind cells may be embedded in a structure wherein the surroundings of the structure may be subjected to constant turbulent wind flows.

Further, the micro wind cell generates power due to flow of wind along the wall of a building. In one more example, micro wind cell array comprises one or more micro wind cells in a horizontal array wherein the array is in an isosceles quadrilateral in shape. In an implementation, the micro wind cell for generating wind power comprises a rotor, an upper support, a lower support, a spacer rod, one or more bearings, a generator mount, a power generator and a rotor pin.

The rotor further comprises a plurality of rotor blades and a through hole formed at the center of the rotor. The through hole is configured to receive a rotor pin. Further, the rotor blades are configured perpendicular to the direction of wind and the rotor rotates for generation of power. In an implementation, the plurality of rotor blades is exposed to multiple directions so as to accept wind force from the surroundings of the micro wind cell. In the implementation, a wind direction which may be parallel to one blade may be perpendicular to another blade of the same rotor. The upper support and the lower support further comprise a horizontal plate configured with a through hole to accommodate a rotor pin. The horizontal plate is further attached to a vertical plate forming an L-section channel. Further, upon assembling the upper and lower support with the rotor by using the spacer rods between the upper and lower support, a firm structure is formed for mounting of generator mount and a power generator. The generator mount may be fastened on the top surface of the upper support to hold a power generator. In one other example, the rotor, the upper and lower supports may be of any other energy absorbing material for damping the vibrations generated during the operation of the wind cell.

In one other implementation a micro wind cell array for generation of power, is disclosed. The micro wind cell array comprises one or more micro wind cells for generating power utilizing flow of wind from multiple directions along a wall, and a battery pack comprising a plurality of batteries for storing the generated power. The micro wind cell further comprises a rotor configured to rotate due to wind flow from multiple directions and a power generator, coupled to the rotor, configured to generate power based upon the rotation of the rotor. The rotor further comprises a plurality of blades configured perpendicular to the direction of wind flow.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any assembly and methods similar or equivalent to those described herein can be used in the practice or testing of embodiments of the present disclosure, the exemplary, assembly and methods are now described. The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described, but is to be accorded the widest scope consistent with the principles and features described herein.

Figure 11:
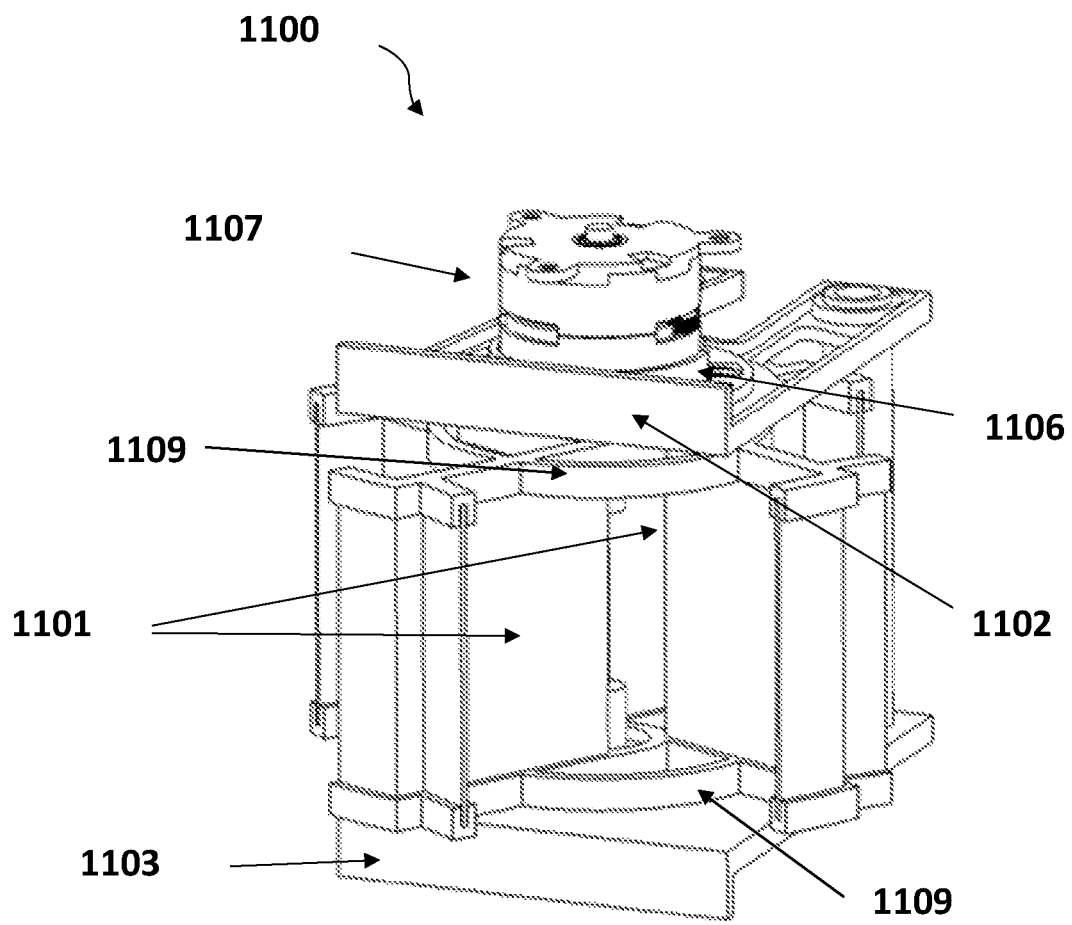
FIG. 11A and FIG. 11B illustrate a micro wind cell for generation of power, in accordance with an embodiment of the present subject matter FIG. 12A
Figure 11:
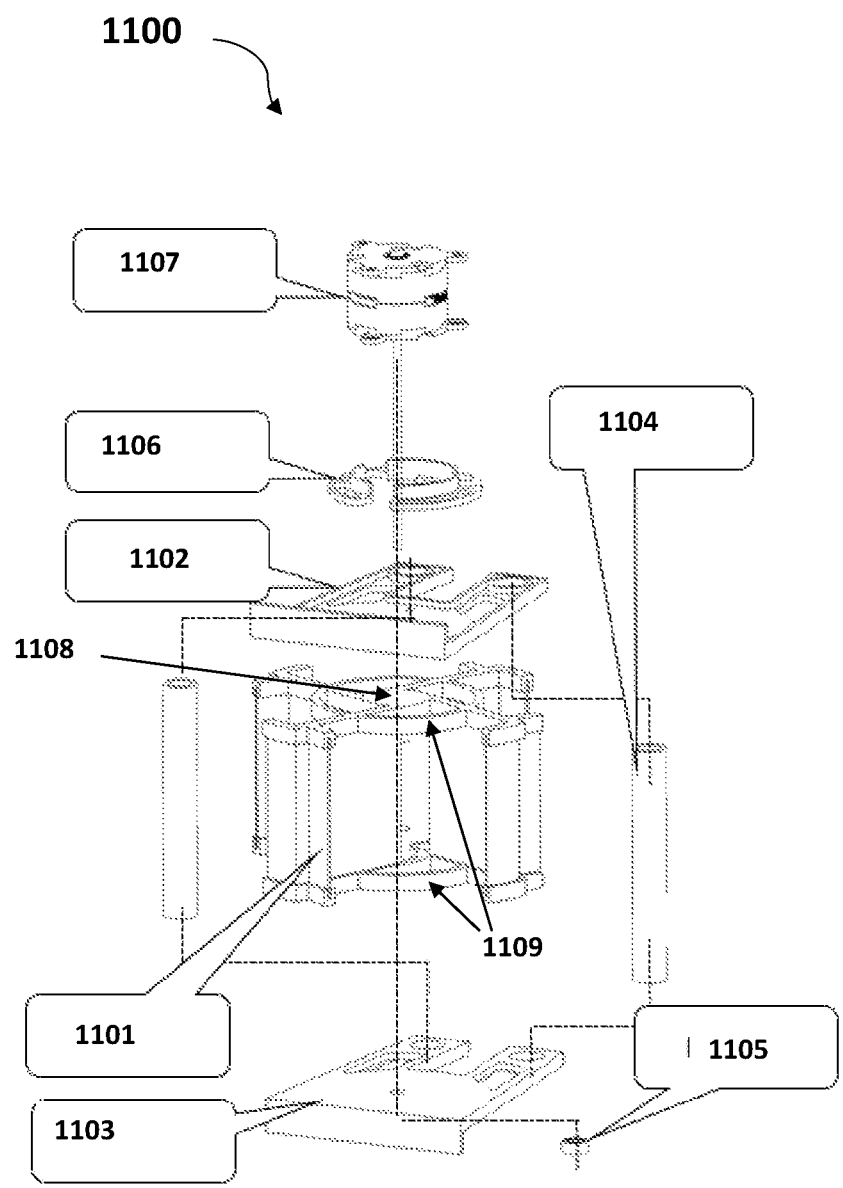

Referring now to FIG. 11A and FIG. 11B a micro wind cell 1100 for generation of power is illustrated, in accordance with an embodiment of the present subject matter. In the embodiment, the micro wind cell 1100 comprises a rotor 1101, an upper support 1102, a lower support 1103, one or more spacer rods 1104, one or more bearings 1105, a generator mount 1106, a power generator 1107 and a rotor pin 1108. In one embodiment, during assembly of the micro wind cell 1100, the rotor 1101, is mounted in between the upper support 1102 and the lower support 1103 which are further leveled and stabilized by one or more spacer rods 1104 inserted between the through holes provided. The rotor pin 1108 is accompanied by one or more bearings 1105. The rotor 1101 further comprises a plurality of rotor blades and a through hole formed at the center of the rotor, wherein the rotor through hole is configured to receive the rotor pin 1108, wherein each rotor blade is exposed to wind force for enabling rotation of the rotor in order to generate power.

In one embodiment, the rotor 1101 may further comprise an array of the plurality of rotor blades protruded from the central block 1108 of the rotor, wherein each rotor blade protrudes from the central block 1108 from an offset point away from the center of the central block 1108. A circular cylindrical structure 1109 at the upper side and the lower side of the rotor running between the rotor blades may be implemented for reinforcing.

Upper Support 1102, Lower Support 1103 and Bearings 1105

Referring to FIG. 11A and FIG. 11B, in an implementation, the upper support 1102 and lower support 1103 comprise a horizontal and vertical plates, each plate forming an L channel shaped structure. In an example, the shape of the upper support 1102 may be similar to the shape of the lower support 1103. The positioning and placing of the plates may define the said channel to be as an upper plate or a lower plate. The upper support 1102 and the lower support 1103 may further comprise holes for accommodating the spacer rods 1104, a center hole for accommodating the rotor pin 1108 and the bearing 1105, and a plane surface for mounting of the generator mount 1106. The upper and lower supports (1102, 1103) may be manufactured by injection molding process or by high pressure die casting process.

Spacer Rods 1104

Referring to FIG. 11B, in an implementation, the spacer rod 1104 is illustrated in accordance with an embodiment of the present subject matter. In an example, multiple spacer rods may be attached between the upper and the lower supports (1102, 1103) mounted through holes on the upper and lower plates. The spacer rod 1104 may be used to increase the stability of the micro wind cell further providing leveling and supporting the upper and lower supports (1102, 1103) as they are cantilevered from the central point.

Generator Mount 1106

Referring to FIG. 11A and FIG. 11B, in the implementation, the generator mount 1106 for the micro wind cell is illustrated in accordance with an embodiment of the present subject matter. In an embodiment, the generator mount 1106 is fastened to the upper support 1102 in order to mount a power generator 1107 adapted to generate the power based upon rotation of the rotor 1101.

Power Generator 1107

Referring to FIG. 11A and FIG. 11B, in an implementation a power generator 1107 for the micro wind cell is illustrated in accordance with an embodiment of the present subject matter. The power generator 1107 may be an Alternating current (AC) or Direct current (DC) generator based on the requirement which may be further mounted on the generator mount 1106 and further connected to a battery charging circuit (also referred as an input module), battery or a plurality of batteries present in the battery pack (also referred as a battery module).

Micro Wind Cell Array 1200

Figure 12:
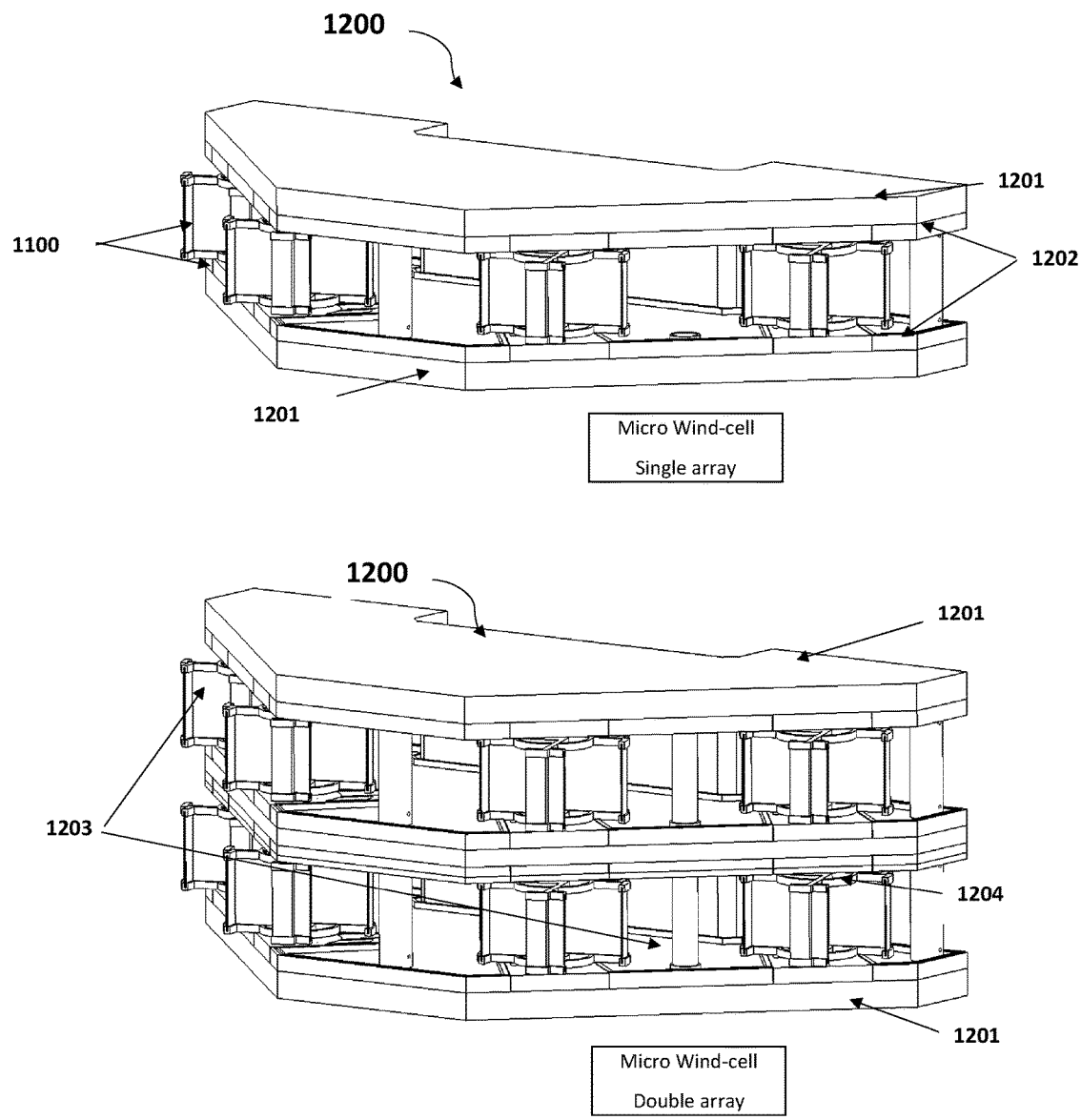
FIG. 12B illustrates, a micro wind cell array, in accordance with an embodiment of the present subject matter.
Figure 12:
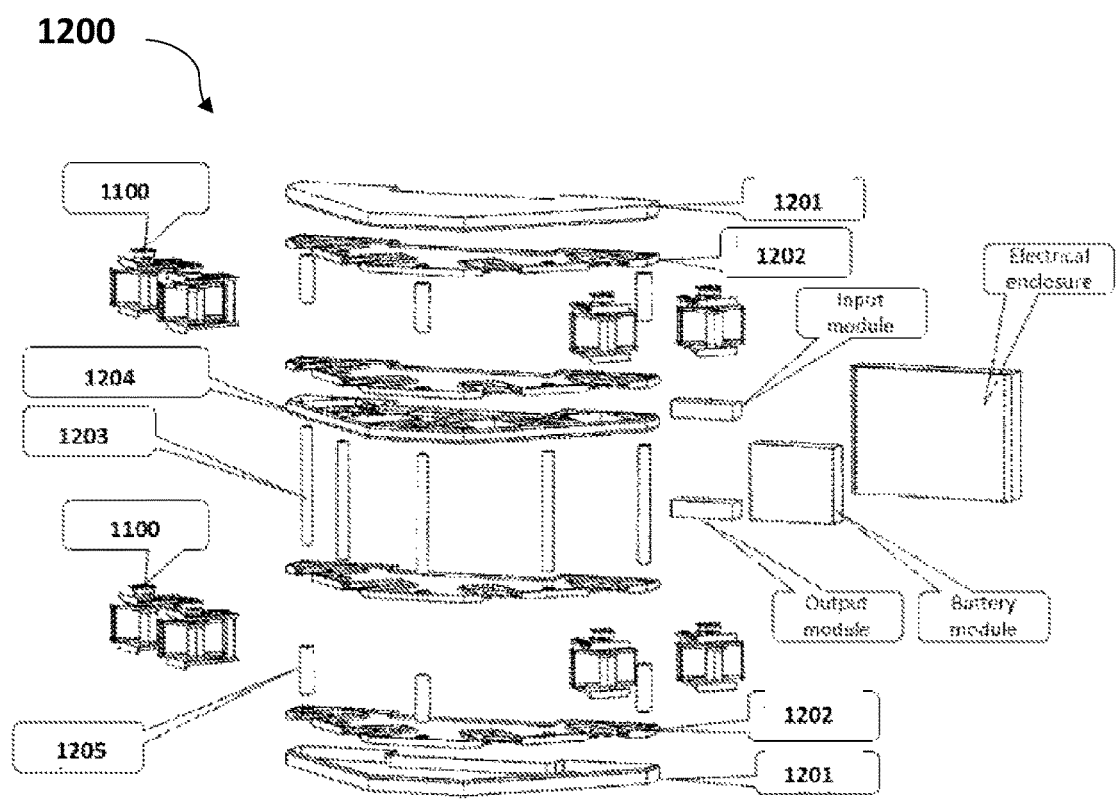

Referring to FIG. 12A and FIG. 12B, in an implementation, a micro wind cell array 1200 is illustrated in accordance with an embodiment of the present subject matter. In one embodiment the micro wind cell array 1200 comprises of micro wind cells 1100 arranged in a row with a line being followed which is similar to a semi isosceles quadrilateral. Such arrangement of the micro wind cells 1100 may enable generation of wind power utilizing the wind force from the wind flowing along a wall. The shape of the array may further enable to stack up multiple micro wind cell arrays 1200 as shown in FIGS. 12A & 12B. The micro wind cell array may be further stacked in two or more layers using stack rods 1203 and stack supports 1204. The micro wind cell array may further comprise at least one outlet, wherein the outlet is a AC three pin plug point, a AC two pin plug point, a DC power point, a USB point, or a mobile charging point.

The micro wind cell array 1200 further comprises a bridge rectifier for a constant polarity output. Further in one example, the bridge rectifier is coupled with a MCP1640 IC to obtain a stable voltage of 4 volts. In another example, the bridge rectifier may be coupled with any other IC for obtaining a stable voltage. The micro wind cell array 1200 also comprises a battery charging circuit and a plurality of batteries forming a battery pack for charging the battery pack. In one embodiment, the micro wind cell array 1200 also comprises an inverter configured to convert DC power to AC power and an outlet, wherein the outlet may be one of a AC three pin plug point, a AC two pin plug point, a DC power point, a USB point, or a mobile charging point. In one example, A.C. output may be in the range of 100 volts to 240 volts (50-60 Hz). In one example, the micro wind cell array 1200 may be manufactured using engineering plastics, composites or co polymers. In another example, the micro wind cell array 1200 may be manufactured using an injection molding process or high pressure die casting process.

Referring to FIG. 12B, the micro wind cell array 1200 may further comprise one or more mount covers 1201, one or more micro wind cell mounts 1202, a plurality of stack rods 1203, one or more stack supports 1204, a plurality of mount spacers 1205, and one or more micro wind cells 1100. The mount cover 1201 may be installed at the top and bottom of a stack of the micro wind cell array enabled for covering the assembly of micro wind cell array. The mount cover 1201 in conjunction with micro wind cell mount 1202 may function like an enclosure which may protect the inside assembly from weathering factors such as rains, dust, moisture, and the like. The micro wind cell array 1200 may further comprise the micro wind cell mount 1202 attached at the top and bottom of each micro wind cell array 1200 with holes and slots for mounting and assembling of the one or more micro wind cells and further for insertion of the stack rods 1203 and the mount spacers 1205. The mount cover 1201 may be attached on top or below the micro wind cell mount 1202. The micro wind cell array 1200 may further comprise a stack support 1204 inserted between two consecutive micro wind cell arrays for engaging the two micro wind cell arrays. Further, in an embodiment, the stack support 1204 is configured with holes and slots for mounting and assembling of the cell mounts 1201 of the micro wind cell arrays 1200 and further for insertion of the stack rods 1203.

In an embodiment, the micro wind cell array 1200 further comprising the mount cover 1201 along with micro wind cell mount 1202 may provide an IP65 enclosure. In one example, the mount cover 1201 may act as a weather sealed cover. In one example, the micro wind cell array mount cover 1201 may be manufactured using engineering plastics, composites or co polymers.

Figure 13:
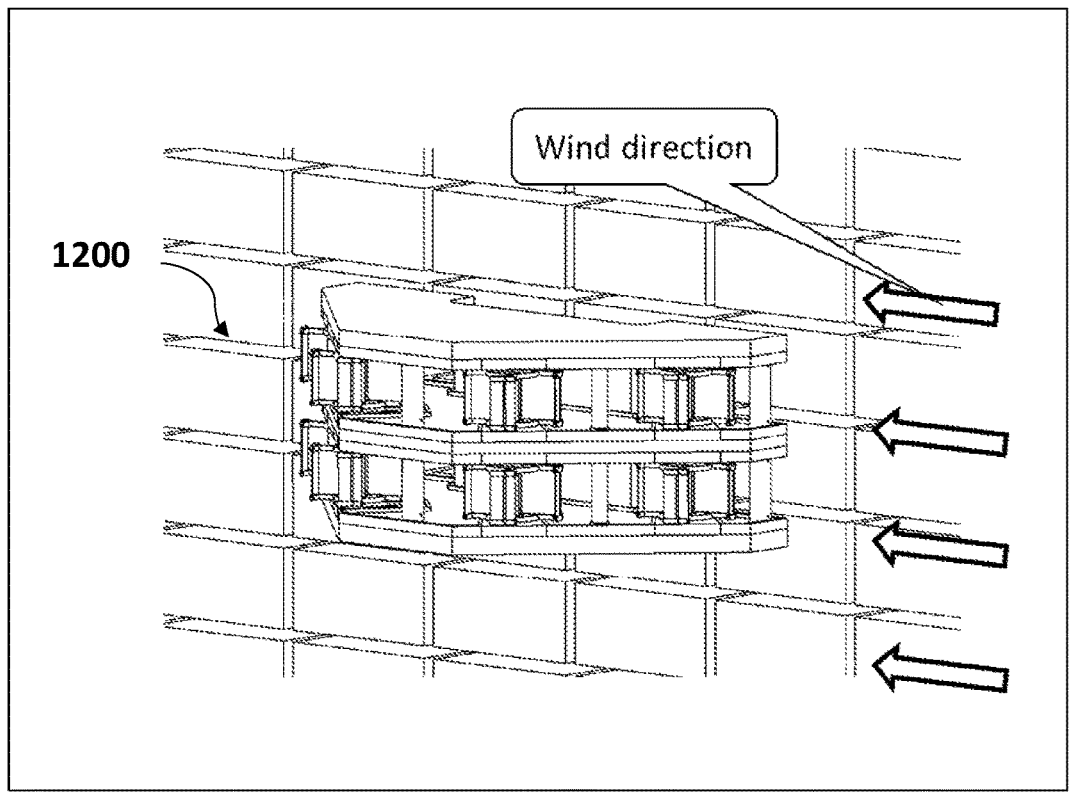
FIG. 13A and FIG. 13B illustrates, micro wind cell arrays attached to a wall of a building, in accordance with an embodiment of the present subject matter.
Figure 13:
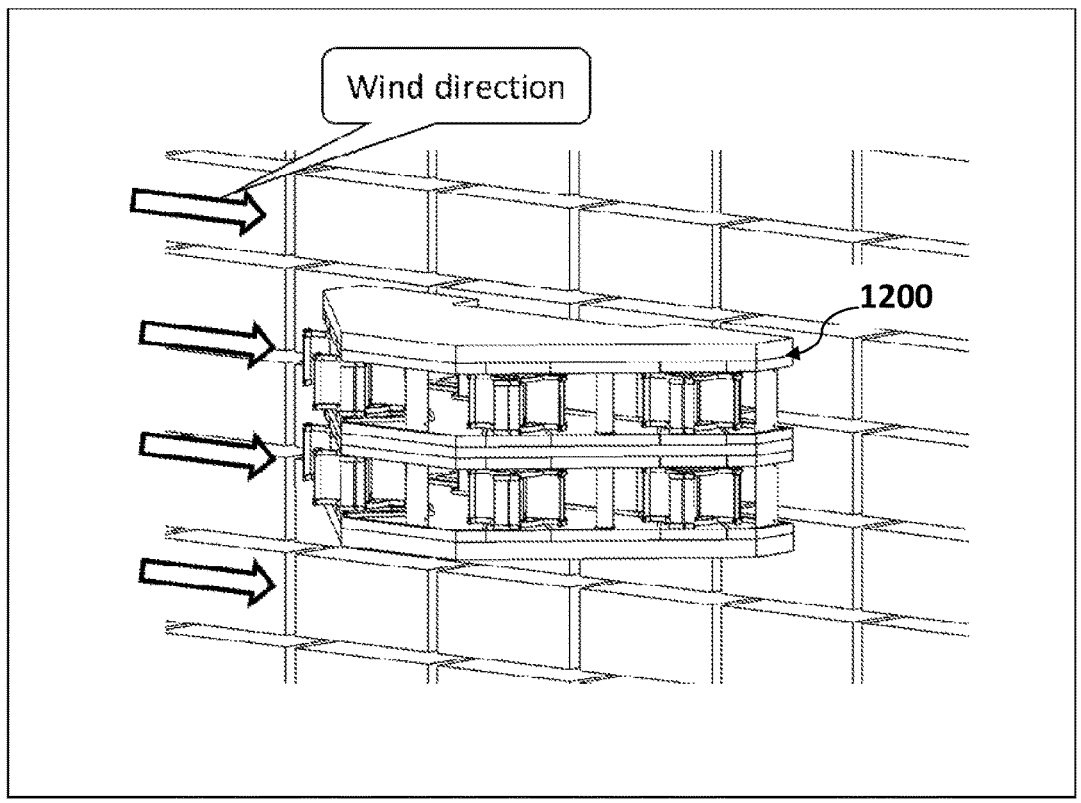

Referring FIGS. 13A and 13B, the micro wind cell array 1200 with 2 stacks attached alongside a wall is illustrated in accordance with an embodiment of the present subject matter. In one embodiment, based upon the wind, the rotor 1101 of the micro wind cell 1100 rotates in the clock wise direction in order to generate power. In another embodiment, the wind may be flowing in the opposite direction and in such scenario, the rotor 1101 may rotate in the antilock wise direction to generate power. The combined arrangement of the rotor 1101 and the stacking of multiple wind cell arrays with the line similar to an isosceles quadrilateral as shown in the FIGS. 13A and 13B enables the wind flow carrying the wind force to each micro wind cell 1100 further facilitating simultaneous working of the micro wind cells 1100 in an array and further in multiple stacks.

Exemplary embodiments discussed above may provide certain advantages. Though not required to practice aspects of the disclosure, these advantages may include those provided by the following features.

Some embodiments of the micro wind cell enable reduction of space.

Some embodiments of the micro wind cell enable power generation utilizing wind following along the wall and horizontal to the ground.

Some embodiments of the micro wind cell enable power generation at low wind speed.

Some embodiments of the micro wind cell enable wind power generation in urban and rural settings.

Although implementations of a micro wind cell and a micro wind cell array for generating wind power have been described in language specific to structural features and/or methods, it is to be understood that the appended claims are not necessarily limited to the specific features or methods described. Rather, the specific features are disclosed as examples of a micro wind cell and a micro wind cell array for generating wind power.

The invention claimed is:

1. A micro wind cell for generation of power, the micro wind cell comprising:
   a rotor comprising a plurality of rotor blades and a rotor through hole formed at the center of the rotor, wherein the rotor through hole is configured to receive a rotor pin, and wherein each rotor blade protrudes from a central block from an offset point away from the center of the central block and is exposed to wind force for enabling rotation of the rotor in order to generate power;

a circular cylindrical structure at the upper side and the lower side of the rotor running between the rotor blades to enable reinforcement in the plurality of blades;

an upper support and a lower support, wherein each of the upper support and the lower support further comprises a horizontal plate configured with a center through hole and a plurality of assembly through holes wherein the upper support and the lower support further comprises a vertical plate attached to the horizontal plate forming an L-shaped channel and wherein each assembly through hole is configured for the insertion of a spacer rod adapted to stabilize the wind cell and further level the height of the wind cell; and a generator mount fastened to the upper support in order to mount a power generator adapted to generate the power based upon rotation of the rotor.

2. The micro wind cell of claim 1, wherein the center through hole of the upper support and the lower support allows insertion of the rotor pin.

3. The micro wind cell of claim 1, wherein each rotor blade is further configured perpendicular to the direction of wind.

4. The micro wind cell of claim 1, wherein the plurality of rotor blades is enabled for conversion of wind force into torque.

5. The micro wind cell of claim 4, wherein the size, design and arrangement of the plurality of blades is adopted in order to gain optimized torque and optimized power generation.

6. The micro wind cell of claim 1, wherein the micro wind cell is manufactured using one of an injection molding process and high pressure die casting process.

7. The micro wind cell of claim 1, wherein the micro wind cell is manufactured using one of engineering plastics, composites and co polymers.

8. A micro wind cell array for generation of power, the micro wind cell array comprising:

one or more micro wind cells arranged in a horizontal plane and in a row for generation of power utilizing wind flow from multiple directions along an exterior wall of a building, each micro wind cell including:

a rotor configured to rotate due to wind flow from multiple directions, wherein the rotor comprises a plurality of rotor blades configured perpendicular to the direction of wind flow, wherein each rotor blade protrudes from a central block from an offset point away from the center of the central block and is exposed to wind force for enabling rotation of the rotor in order to generate power;

a circular cylindrical structure at the upper side and the lower side of the rotor running between the rotor blades to enable reinforcement in the plurality of blades;

an upper support and a lower support, wherein each of the upper support and the lower support further comprises a horizontal plate configured with a center through hole and a plurality of assembly through holes wherein the upper support and the lower support further comprises a vertical plate attached to the horizontal plate forming an L-shaped channel and wherein each assembly through hole is configured for the insertion of a spacer rod adapted to stabilize the wind cell and further level the height of the wind cell; and a power generator coupled to the rotor configured to generate power based upon the rotation of the rotor;

a mount cover installed at the top and bottom of a stack of the micro wind cell array enabled for covering the assembly of micro wind cell array;

a micro wind cell mount at the top and bottom of each micro wind cell array with holes and slots for mounting and assembling of the one or more micro wind cells and further for insertion of stack rods and mount spacers, wherein the mount cover in conjunction with micro wind cell mount forms an enclosure; and a stack support inserted between two consecutive micro wind cell array arrays for engaging the two micro wind cell consecutive arrays, wherein the stack support is configured with holes and slots for mounting and assembling of the cell mounts of the micro wind cell arrays and further for insertion of the stack rods.

9. The micro wind cell array of claim 8 wherein a battery amongst a plurality of batteries forming a battery pack is connected to the micro wind cell for storing the generated power.

10. The micro wind cell array of claim 8, wherein the micro wind cell array comprises one or more micro wind cell arranged in the row with a line followed in an isosceles quadrilateral shape to optimize the absorption of wind flow energy from multiple directions.

11. The micro wind cell array of claim 10 wherein the isosceles quadrilateral shape enables stacking the micro wind cell array with one or more other micro wind cell arrays.

12. The micro wind cell array of claim 8 further comprising:

a bridge rectifier for a constant polarity output, wherein the bridge rectifier is coupled with a MCP1640 IC to obtain a stable voltage of 4 volts;

a battery charging circuit for charging the battery; and an inverter configured to convert DC power to AC power.

13. The micro wind cell array of claim 8, wherein the mount cover, stack support and micro wind cell mount is manufactured using one of an injection molding process and high pressure die casting process.

14. The micro wind cell array of claim 8, wherein micro wind cell array is manufactured using one of engineering plastics, composites and co polymers.

15. The micro wind cell array of claim 8 further comprising at least one outlet, wherein the outlet is a AC three pin plug point, a AC two pin plug point, a DC power point, a USB point, or a mobile charging point.

16. The micro wind cell array of claim 8, wherein the micro wind cell array is mounted on a wall of a building or embedded in the wall of the building, and wherein energy is generated due to flow of wind along the wall of the building.

* * * * *